United States Patent
Gianchandani et al.

(10) Patent No.: US 10,866,220 B2
(45) Date of Patent: Dec. 15, 2020

(54) PROGRESSIVE CELLULAR ARCHITECTURE FOR MICROFABRICATED GAS CHROMATOGRAPH

(71) Applicant: The Regents of The University of Michigan, Ann Arbor, MI (US)

(72) Inventors: Yogesh B. Gianchandani, Ann Arbor, MI (US); Yutao Qin, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 269 days.

(21) Appl. No.: 15/978,744

(22) Filed: May 14, 2018

(65) Prior Publication Data

US 2019/0346411 A1    Nov. 14, 2019

Related U.S. Application Data

(60) Provisional application No. 62/506,340, filed on May 15, 2017.

(51) Int. Cl.
    *G01N 30/60* (2006.01)
    *G01N 30/78* (2006.01)
    (Continued)

(52) U.S. Cl.
    CPC ....... *G01N 30/6095* (2013.01); *G01N 30/461* (2013.01); *G01N 30/78* (2013.01); *G01N 2030/025* (2013.01)

(58) Field of Classification Search
    CPC .. G01N 30/6095; G01N 30/461; G01N 30/78; G01N 2030/025
    (Continued)

(56) References Cited

U.S. PATENT DOCUMENTS

| 5,198,115 A * | 3/1993 | Stalling | G01N 25/14 210/137 |
| 6,455,003 B1 * | 9/2002 | Anvia | G01N 1/40 422/88 |

(Continued)

OTHER PUBLICATIONS

Serrano G et al "Comprehensive Two-Dimensional Gas Chromatographic Separations With a Microfabricated Thermal Modulator", Anal. Chem., 84 (16) (2012).

(Continued)

*Primary Examiner* — Peter J Macchiarolo
*Assistant Examiner* — Monica S Young
(74) *Attorney, Agent, or Firm* — Harness, Dickey & Pierce, P.L.C.

(57) ABSTRACT

In order to achieve a system capable of analyzing a wide range of compounds while saving time and energy consumption, a progressive cellular architecture is presented for vapor collection and gas chromatographic separation. Each cell includes a preconcentrator and separation column that are adapted for collecting and separating compounds only within a specific volatility range. A wide volatility range can therefore be covered by the use of multiple cells that are cascaded in the appropriate order. The separation columns within each cell are short enough to reduce the heating and pumping requirements. The gas flow for vapor collection and separation is provided by low-power gas micropumps that use ambient air. The system is also configurable to incorporate capabilities of detecting and reducing vapor overload. The progressive cellular architecture directly address the compromise between low power and broad chemical analyses.

17 Claims, 9 Drawing Sheets

(51) Int. Cl.
*G01N 30/46* (2006.01)
*G01N 30/02* (2006.01)

(58) Field of Classification Search
USPC .......................................................... 73/23
See application file for complete search history.

(56) References Cited

U.S. PATENT DOCUMENTS

| | | | |
|---|---|---|---|
| 6,666,907 B1 | 12/2003 | Magninell et al. | |
| 7,281,408 B2 * | 10/2007 | Srinivasan | B01J 19/0046 |
| | | | 422/89 |
| 7,654,130 B2 | 2/2010 | Shah et al. | |
| 8,020,426 B2 * | 9/2011 | Gross | G01N 7/02 |
| | | | 73/23.2 |
| 9,714,925 B2 * | 7/2017 | Akmal | G01N 30/04 |
| 2005/0269264 A1 * | 12/2005 | Fermier | G01N 30/36 |
| | | | 210/635 |
| 2009/0150087 A1 | 6/2009 | Steinecker | |
| 2009/0158820 A1 * | 6/2009 | Bostrom | G01N 30/62 |
| | | | 73/61.53 |
| 2010/0250146 A1 * | 9/2010 | Alm | G01N 30/463 |
| | | | 702/24 |
| 2011/0088452 A1 | 4/2011 | Kim et al. | |
| 2011/0259081 A1 * | 10/2011 | Chou | G01N 30/465 |
| | | | 73/23.42 |
| 2013/0125620 A1 * | 5/2013 | Ovadia | G01N 33/0057 |
| | | | 73/23.39 |
| 2014/0260535 A1 * | 9/2014 | McGill | G01N 21/3504 |
| | | | 73/23.37 |
| 2014/0298990 A1 * | 10/2014 | Fan | G01N 30/465 |
| | | | 95/23 |
| 2015/0143872 A1 * | 5/2015 | Hassan | G01N 29/022 |
| | | | 73/23.4 |
| 2015/0153299 A1 * | 6/2015 | Chou | G01N 33/0075 |
| | | | 205/775 |
| 2018/0172646 A1 * | 6/2018 | Hall | G01N 30/14 |
| 2019/0154638 A1 * | 5/2019 | Cardin | G01N 30/40 |
| 2019/0265214 A1 * | 8/2019 | Rubenstein | B01J 20/262 |
| 2020/0033301 A1 * | 1/2020 | Cardin | G01N 30/10 |

OTHER PUBLICATIONS

Collin WR et al. "Comprehensive two-dimensional gas chromatographic separations with a temperature programmed microfabricated thermal modulator," J. Chromatogr A. 29, (2016).

Collin WR et al "uGC x uGC: comprehensive two-dimensional gas chromatographic separations with microfabricated components", Anal Chem 87 (3) (2015).

Liu et al "Demonstration of Motionless Knudsen Pump Based Micro-Gas Chromatography Featuring Micro-Fabricated Columns and On-Column Detectors", Lab Chip 11(20):3487-92 (Oct. 21, 2011).

* cited by examiner

PROGRESSIVE CELLULAR ARCHITECTURE FOR MICROFABRICATED GAS CHROMATOGRAPH

CROSS-REFERENCE TO RELATED APPLICATIONS

This application claims the benefit of U.S. Provisional Application No. 62/506,340, filed on May 15, 2017. The entire disclosure of the above application is incorporated herein by reference.

GOVERNMENT CLAUSE

This invention was made with government support under Grant No. FA8650-17-C-9105 awarded by the U.S. Air Force/AFRL. The Government has certain rights in this invention.

FIELD

The present disclosure relates to progressive cellular architecture for microfabricated gas chromatograph.

BACKGROUND

Analyses of very complex mixtures of volatile organic compounds (VOCs) and even semivolatiles typically require the use of gas chromatography. In conventional gas chromatography, the vapor mixtures are separated in a long separation column coated with a stationary phase material. Some gas chromatographs incorporate columns with both non-polar and polar stationary phases, allowing species to be separated not only on the basis of volatility but also on the basis of molecular polarity, thereby providing multi-dimensional separation.

However, the conventional architectures for both uni- and multi-dimensional gas chromatography must compromise between the effectiveness of separation for a wide range of VOCs and the overall separation time. The separation of high-volatility compounds in a vapor mixture typically requires a very long column—typically 10-60 m—that is coated with a highly retentive stationary phase that is comprised of a highly porous layer or a thick layer of an adsorptive material like silicone. In order to elute the low-volatility compounds, which are also present in the same vapor mixture and strongly retained by the stationary phase, the column must be elevated to a temperature of 200-300° C., which consumes substantial power and which may also cause degradation of stationary phase. Additionally, the use of the long column presents a pressure load that requires the use of a gas pump with relatively high power consumption, or the use of a pressurized carrier gas cylinder, which is a consumable item.

Thus, conventional architectures for gas chromatography present a fundamental compromise between time or energy consumed per analysis and the volatility range of compounds that can be separated. This disclosure pertains to an architecture that breaks through this compromise by utilizing the time and energy used in the sampling period, prior to the traditional initiation of the analysis. This architecture is made possible by the use of arrays of microfabricated elements in a manner that is inspired by modern electronic architecture.

This section provides background information related to the present disclosure which is not necessarily prior art.

SUMMARY

This section provides a general summary of the disclosure, and is not a comprehensive disclosure of its full scope or all of its features.

A progressive cellular architecture is presented for microfabricated gas chromatography. The gas chromatography comprises: two or more preconcentrators coupled together in series, a separation column associated with each preconcentrator of the two or more preconcentrators, and a three-port fluidic coupling device disposed at an inlet of each preconcentrator in the two or more preconcentrators. Each preconcentrator includes a chamber through which the analyte passes and sorbent material within the chamber. Of note, surface area of sorbent material residing in a given preconcentrator increases from the input to the output across the two or more preconcentrators. Each separation column has a channel through which the analyte passes. The stationary phases may vary amongst the separation columns. The first port of the fluidic coupling device is configured to receive an incoming analyte, the second port of the fluidic coupling device is fluidly coupled to an inlet of an associated preconcentrator and a third port of the fluidic coupling device is fluidly coupled to an inlet of an associated separation column.

A pump may be fluidly coupled to an output of the two or more preconcentrators.

A detector may be selectively coupled to each of the separation columns, such that each separation column has an outlet fluidly coupled by a separation path to the detector.

In one embodiment, each of the three-port fluidic coupling device is configured in a normally open position whereby the first port is fluidly coupled to the second port while gas flow through the third port is blocked. A controller is operably coupled to each of the fluidic coupling devices. During the collection phase, the controller maintains each of the fluidic coupling devices in the normally open position. During the separation phase, the controller actuates each of the fluidic coupling devices in succession from a normally open position to a closed position during a separation phase, whereby the second port is fluidly coupled to the third port while the first port is blocked in the closed position.

Further areas of applicability will become apparent from the description provided herein. The description and specific examples in this summary are intended for purposes of illustration only and are

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
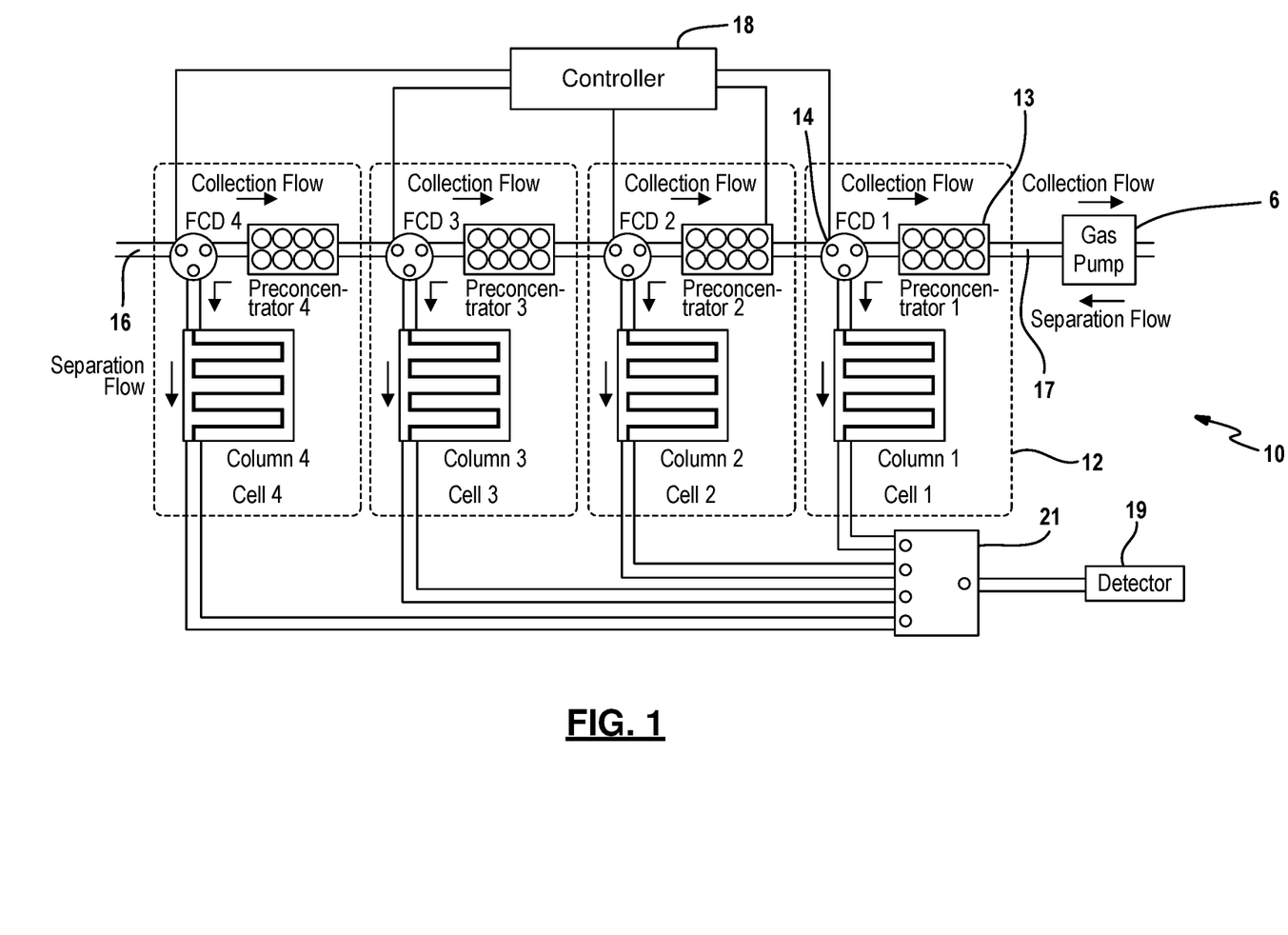
FIG. 1 depicts an example embodiment of the progressive cellular architecture of a gas chromatograph.

FIG. 1 depicts an example embodiment of a gas chromatograph 10 with a progressive cellular architecture of a gas chromatograph. The progressive cellular architecture is designed for analyzing broad ranges of compounds in an energy efficient manner. Each cell 12 includes a microfabricated preconcentrator 13 and separation column 15 that are customized for collecting and separating compounds within a specific volatility range. A wide volatility range can be covered by the use of multiple cells that are cascaded in the appropriate order. During the collection phase, each cell traps the least volatile species available to it, while allowing lighter species to travel progressively downstream; during separation, the cells are drained one at a time, starting from the one that captured the most volatile species, and was, therefore, located furthest downstream during sampling. A simple manifestation may include only four cells is shown in FIG. 1. Each cell 12 includes a preconcentrator 13, a separation column 15, and a three-port flow control device (FCD) 14; all three components may be microfabricated. The four cells are arrayed such that the four preconcentrators are in series during sampling. Progressing from Cell4 to Cell1, the designs are adapted for increasing volatility ranges. In other words, amongst these four cells, Preconcentrator4 has the weakest sorbent (i.e., of the lowest surface area) and Column4 has the least retentive stationary phase for semi-volatile compounds; Preconcentrator1 has the strongest sorbent (i.e., of the highest surface area) and Column1 has the most retentive stationary phase for highly volatile compounds; the other two cells have elements with progressive intermediate values.

More specifically, the progressive cellular architecture of the gas chromatograph 10 may be described as follows. Two or more preconcentrators 13 are coupled together in series. The preconcentrators 13 have an input 16 configured to receive a carrier gas and an output 17. Each preconcentrator 13 includes a chamber through which the carrier gas passes, and sorbent material embedded in the chamber. In one embodiment, the sorbent material is in the form of granules. The surface area of sorbent material residing in a given preconcentrator preferably increases from the input to the output (left to right in FIG. 1) across the two or more preconcentrators 13.

A pump 6 is fluidly coupled to the output of the two or more preconcentrators 13. The pump 6 operates to draw the carrier gas in a first direction into and through the preconcentrators 13 during a collection phase and operates to drive the carrier gas in a second direction opposite to the first direction during a separation phase. In one embodiment, the pump 6 is further defined as a Knudsen pump although other types of bidirectional pumps as contemplated by this disclosure.

A separation column 15 is associated with each preconcentrator 13. Each separation column 15 has a channel through which the carrier gas passes and operates to separate analyte molecules from the carrier gas. Each separation column 15 includes a stationary phase and the stationary phases vary amongst the separation columns.

A three-port fluidic coupling device (FCD) 14 is disposed at an inlet of each preconcentrator 13. The first port of the device 14 is configured to receive an incoming gas from either the system input or outlet of an adjacent preconcentrator. The second port of the device 14 fluidly couples an inlet of the preconcentrator and a third port of the device fluidly couples to an inlet of an associated separation column. Each of the three-port FCDs 14 is configured in a normally open position whereby the first port is fluidly coupled to the second port while the gas flow through the third port is blocked. In one embodiment (FIG. 7A), the three-port FCD comprises two open/close valves; where, the first open/close valve is fluidly connected between the first port and the second port; whereas, the second open/close valve is fluidly connected between the second port and the third port. Recognizing that the placement of an open/close valve upstream or downstream of a separation column is equivalent, the fluidic connection between the second port and the second open/close valve may in fact comprise a separation column. Other implementations for the three-port FCD fall within the scope of this disclosure.

A controller 18 is operably coupled to each of the FCDs 14. During a collection phase, the controller 18 maintains each of the three-port FCDs 14 in the normally open position as further described below. In an exemplary embodiment, the controller 18 is implemented as a microcontroller. It should be understood that the logic for the controller 18 can be implemented in hardware logic, software logic, or a combination of hardware and software logic. In this regard, controller 18 can be or can include any of a digital signal processor (DSP), microprocessor, microcontroller, or other programmable device which are programmed with software implementing the above described methods. It should be understood that alternatively the controller 18 is or includes other logic devices, such as a Field Programmable Gate Array (FPGA), a complex programmable logic device (CPLD), or application specific integrated circuit (ASIC). When it is stated that controller 18 performs a function or is configured to perform a function, it should be understood that controller 18 is configured to do so with appropriate logic (such as in software, logic devices, or a combination thereof).

Figure 7A:
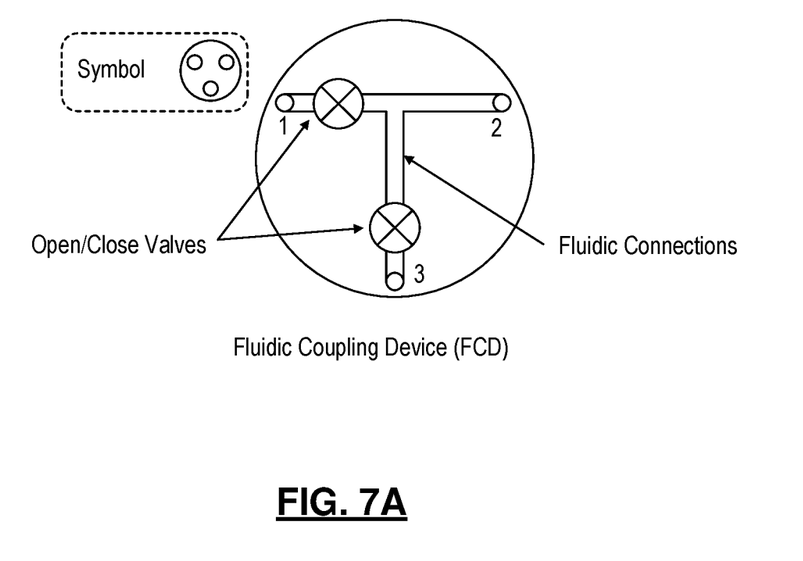
FIG. 7A is a diagram illustrating an exemplary implementation of a three-port FCD.
Figure 7B:
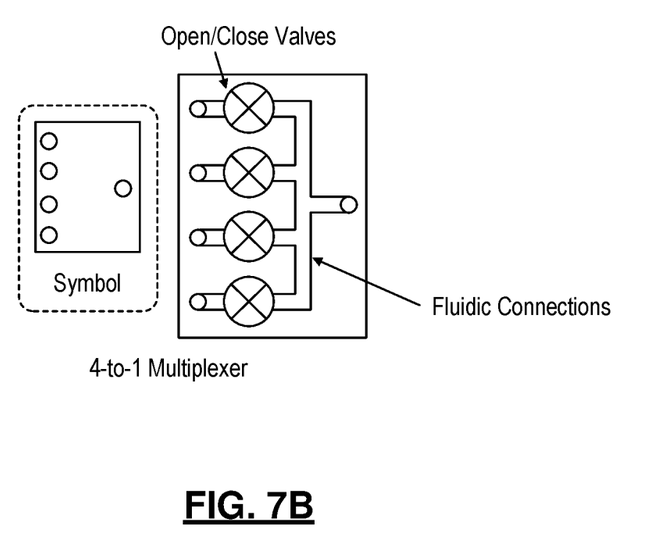
FIG. 7B is a diagram illustrating an exemplary implementation of a 4-to-1 multiplexer.

A detector 19 is selectively coupled to each of the separation columns 15. In particular, each separation column 15 has an outlet fluidly coupled by a separation path to the detector 19. In one embodiment, the separation columns 15 are coupled to the detector 16 without the use of any flow control device. In another embodiment, the separation columns 15 are coupled by way of a 4-to-1 multiplexer 21 to the detector 16, where the multiplexer 21 is comprised of four open/close valves (FIG. 7B). In some embodiments, each open/close valve of the multiplexer 21 may also concurrently serve as the second open/close valve of the three-port FCD (FIG. 7A). Other means for selectively coupling the separation columns to the detector are also contemplated.

During vapor collection, FCDs1-4 are switched to allow gas flow through the preconcentrators 13 while blocking the flow through the separation columns 15. The pump 6 provides the prescribed gas flow for vapor collection, drawing the ambient vapor sample through the preconcentrators 13 in the sequence from Preconcentrator4 to Preconcentrator1. Because of the distinctive sorption characteristics of the four preconcentrators, a particular vapor species is predominantly trapped by a particular preconcentrator; the other upstream preconcentrators with much weaker sorbents only adsorb a smaller portion of this vapor species while allowing breakthrough of the majority of this species; the other downstream preconcentrators are not substantially exposed to this vapor species. Therefore, during vapor collection, a de facto preliminary separation is achieved.

During analytical separation, the gas pump 6 reverses the gas flow and the FCDs are switched to direct the gas flow sequentially from Cell1 to Cell4, one cell at a time. In this process, FCD1 is first switched to allow flow through Preconcentrator1 and Column1. Preconcentrator1 is then heated by a thermal pulse in order to inject the vapor mixture into Column1 for separation. After the separation in Column1 is completed, FCD1 is switched back to connect Preconcentrator1 and Preconcentrator2. This process is repeated for Cell2, Cell3, and Cell4 sequentially. The separation columns are intended to be short microfabricated columns (e.g., not more than 1 m long) that require minimal or no heating to elute the species. A 4-to-1 multiplexer, which is a combination of four open/close valves, is located downstream of the separation columns to route the eluted vapor species to any vapor identification device, i.e., detector 19. Note that the architecture can easily be scaled to include more cells with proper selection of the sorbents in the preconcentrators and the stationary phases in the columns, thereby accommodating a very broad range of analyses.

In the example embodiment, the carrier gas used for separation is ambient air although other types of carrier gases are contemplated. The gas pump 6 used in the progressive cellular architecture should be capable of providing bi-directional gas flow. This can be achieved by using either a single bi-directional gas pump, or the combination of two uni-directional gas pumps and valves. Other types of gas pumps also fall within the scope of this disclosure.

Figure 2A:
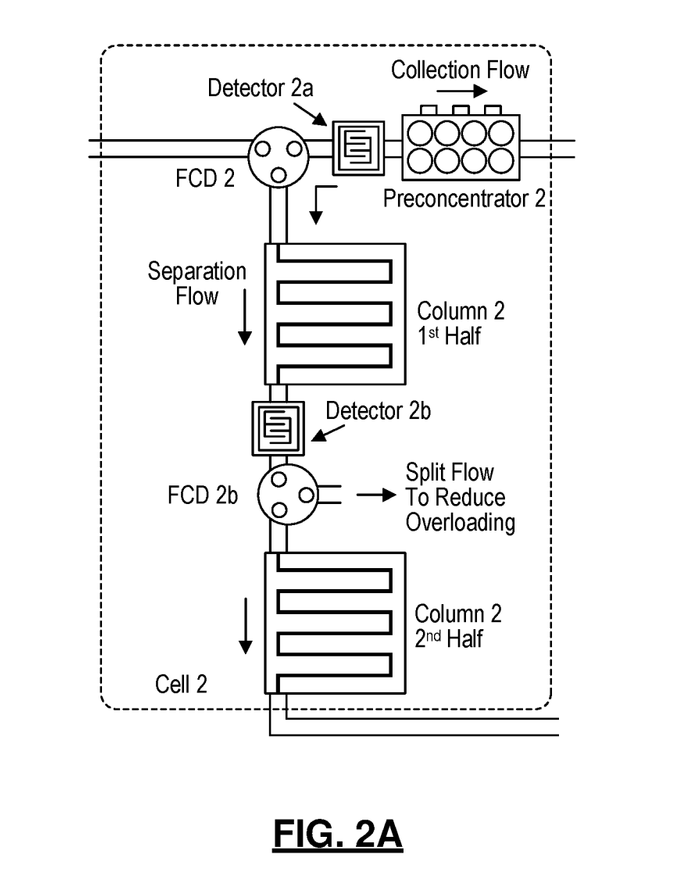
FIG. 2A is a diagram depicting an alternative cell arrangement in which a detector and a FCD are added halfway along the column for real-time monitoring and reduction of overloading vapor species.

Two design options enhance system performance. Referring to FIG. 2A, option 1 addresses potential vapor overloading problems and increases the range of vapor concentration (i.e., dynamic range) that can be accommodated by the system. This requires two detectors for detecting the occurrence of overloading in the preconcentrator and separation column, respectively. For example, in Cell2 (FIG. 2A), Detector2a is positioned upstream of Preconcentrator2 in the vapor collection path. If a remarkably high vapor concentration is detected by Detector2a during vapor collection, the collection volume can be reduced either by reducing the flow rate provided by the pump or by reducing the collection period. Detector2b and FCD2b are connected halfway along Column2. During separation, the upstream half of Column2 performs the initial separation. If an extraordinarily large peak magnitude is detected by Detector2b, FCD2b is partially or fully switched to split the flow temporarily, venting a portion of the peak to the ambient, and then switched back to connect the flow into the downstream half of Column2 to resume the separation. In this option, only the overloading species is reduced, whereas the other low-concentration species are preserved without compromising quantitative analysis.

Figure 2B:
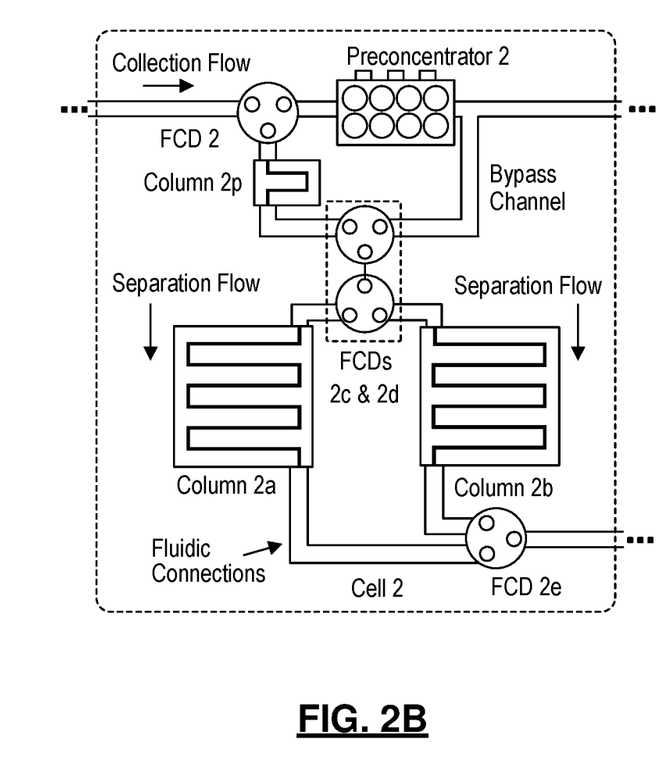
FIG. 2B is a diagram depicting an alternative cell arrangement in which non-polar and polar columns are incorporated in a cell.

Referring to FIG. 2B, option 2 enhances the separation capability within a cell by incorporating both non-polar and polar separation columns in the cell. For example, in Cell2 (FIG. 2B), Column2p is a short, highly-polar column that performs an initial separation of the vapor mixture into two groups. The first eluting group includes mostly non-polar vapor species; this group is routed by FCD2c and FCD2d into Column2a, a non-polar column, for further separation. For the separation in Column2a, the carrier gas flow is provided through the bypass channel, whereas the flow in Column2p is paused. After the separation in Column2a is completed, the flow in Column2p is resumed, transporting the second eluting group from Column2p into Column2b for further separations. The process can be assisted by optional heating of Column2p to provide a sharp injection into Column2b. The second eluting group from Column2p includes mostly polar vapor species and possibly a few low-volatility non-polar species. Column2b is a polar column suited for separating these species.

Returning to FIG. 1, further details are provided for the example system. In the example system, each cell 12 includes a preconcentrator 13 with a specific type of sorbent material. Cell1 and Cell4 each include a single 1 m-long separation column; whereas, Cell2 and Cell3 each include three separation columns: a 0.1 m-long polar column that separates the mixture into a non-polar group and a polar group, a 1 m-long non-polar column that further separates the non-polar group, and a 1 m-long polar column that further separates the polar group (2B). To address the possible vapor overloading problems caused by high concentration levels of certain species, each cell 12 includes a capacitive detector in the vapor collection path to detect overloading in the preconcentrators (FIG. 2A), which can be reduced by limiting the vapor collection volume. Each cell also includes an additional capacitive detector and three-port FCD halfway along each 1 m-long separation column to detect and split the overloading species (FIG. 2A). Exemplary parameters of each cell in the example embodiment are summarized below in Table 1.

TABLE 1

The parameters of preconcentrators and separation columns in an example 4-cell system.

| Cell # | Component | Key parameters* | Target vapor range |
|---|---|---|---|
| Cell4 | Preconcentrator4 | Glass beads, 1 mg | Volatility within n-alkanes $C_{12}$-$C_{15}$ |
|  | Column4 | DB-5 ms, 1 m × 250 µm × 0.01 µm |  |
| Cell3 | Preconcentrator3 | Carbopack C, 1 mg | Volatility within n-alkanes $C_9$-$C_{12}$ |
|  | Column3a | OV-1, 1 m × 250 µm × 0.2 µm |  |
|  | Column3b | OV-215, 1 m × 250 µm × 0.2 µm |  |
|  | Column3p | Carbowax 20M, 0.1 m × 250 µm × 0.2 µm |  |
| Cell2 | Preconcentrator2 | Carbopack B, 1 mg | Volatility within n-alkanes $C_5$-$C_9$ |
|  | Column2a | OV-1, 1 m × 250 µm × 2 µm |  |
|  | Column2b | OV-215, 1 m × 250 µm × 2 µm |  |
|  | Column2p | Carbowax 20M, 0.1 m × 250 µm × 2 µm |  |

TABLE 1-continued

The parameters of preconcentrators and separation columns in an example 4-cell system.

| Cell # | Component | Key parameters* | Target vapor range |
|---|---|---|---|
| Cell1 | Preconcentrator1 | Carbosieve SIII, 1 mg | Volatility within n-alkanes $C_2$-$C_5$ |
| | Column1 | Porous alumina, 1 m × 250 µm × 2 µm | |

*The parameter format for the preconcentrators is "sorbent brand name, sorbent mass". The parameter format for the separation columns is "Stationary phase material, column length × column hydraulic diameter × stationary phase thickness".

Figure 8:
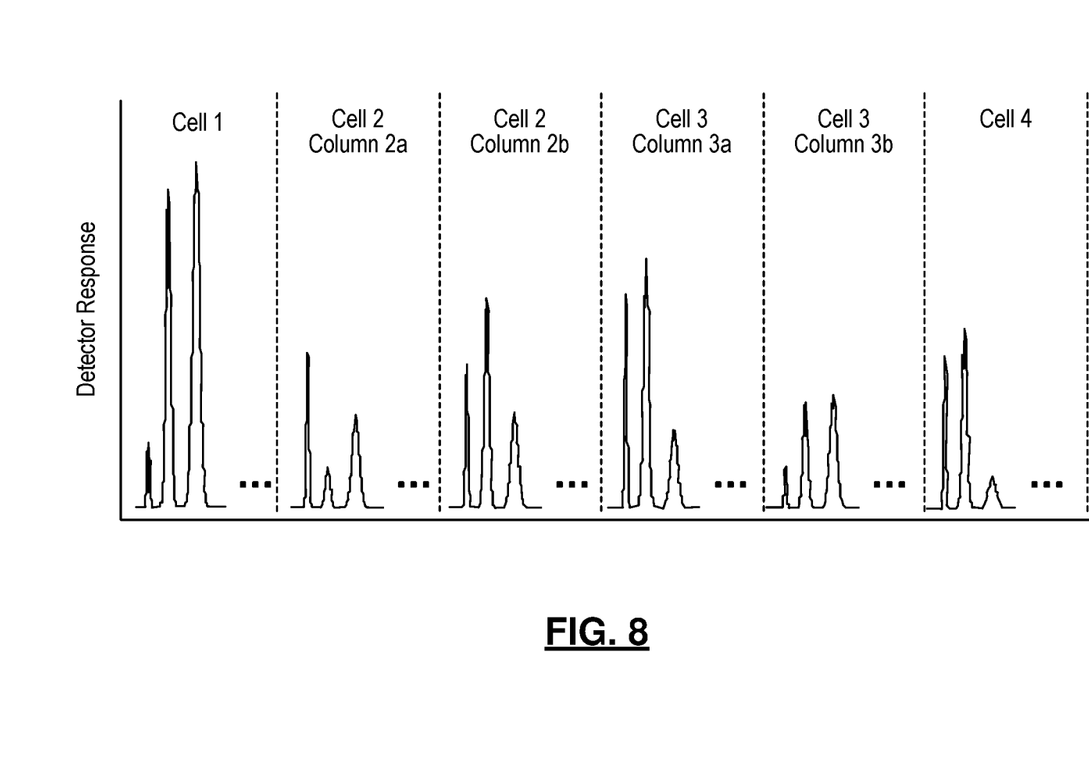
FIG. 8 illustrates an exemplary chromatogram provided by the detector that receives gas from all the cells.

An example of the expected chromatogram provided by the detector that receives gas from all the four cells is illustrated in FIG. 8.

Figure 3:
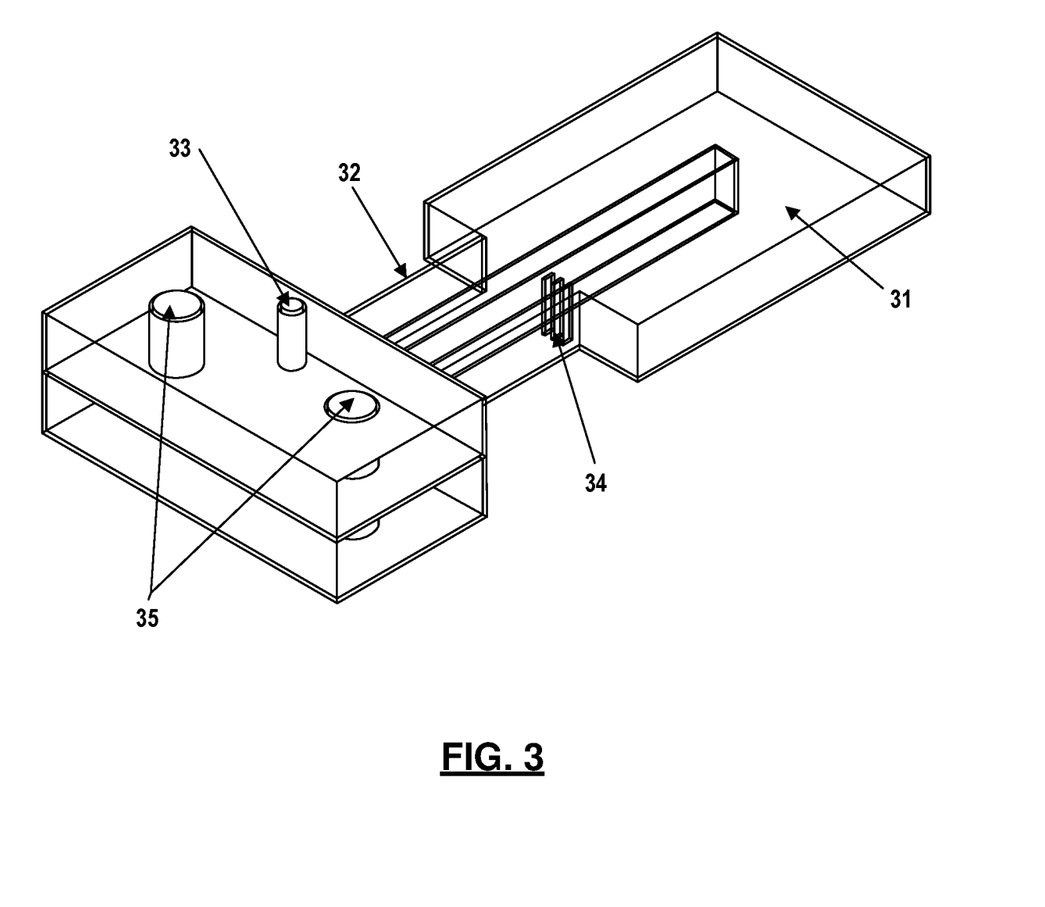
FIG. 3 is a diagram depicting a low-power preconcentrator.

Preconcentrators hold the sorbent particles within a microfabricated chamber. An on-chip thin-film Joule heater provides the thermal pulse necessary to desorb the sample. In an example embodiment, the sorbent chamber 31 will have a U-shape channel with 2 µL volume that can contain mg of sorbent particles as seen in FIG. 3. The chamber 31 will be connected to the anchor through a supporting bridge. All the chamber and the bridge walls will be made of thin dielectric layers, minimizing both heat conduction and thermal mass. The gas flow inlet and outlet 35 will be positioned at the anchor, which will be made of silicon that provides sufficient mechanical robustness for handling. A sorbent loading port 33 and sorbent confinement structures 34 will also be included. For a 4-cell system, the sorbents in Preconcentrators 4-1 will be glass beads, Carbopack C, Carbopack B, Carbosieve SIII, respectively. Other sorbent types such as Carbopack F and Carbopack X are also contemplated by this disclosure.

Figure 4A:
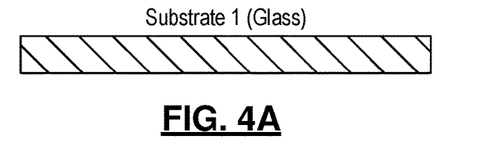
FIGS. 4A-4H are diagrams illustrating a glass micromachining process for low-power preconcentrators.
Figure 4B:
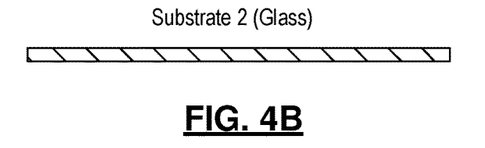
Figure 4C:
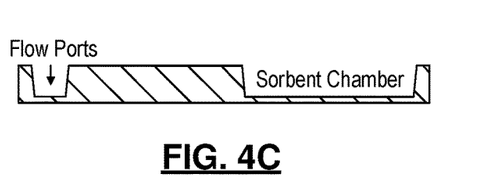
Figure 4D:
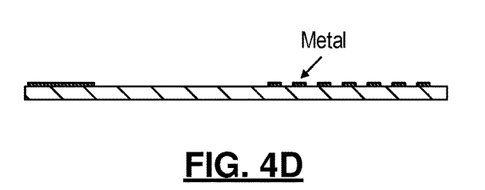
Figure 4E:
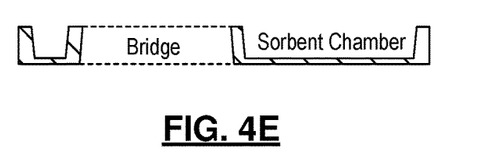
Figure 4F:
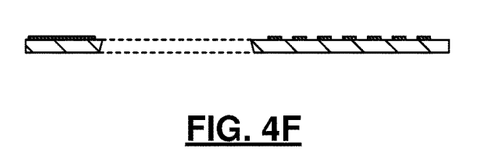
Figure 4G:
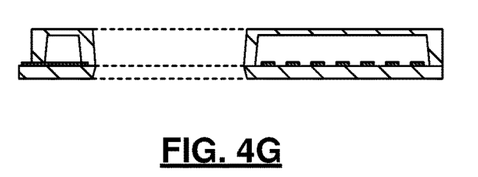
Figure 4H:
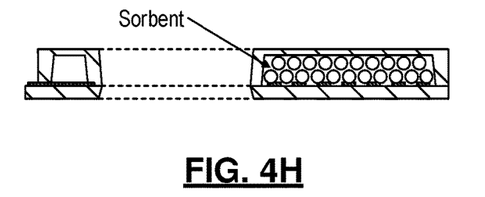

Two different fabrication approaches for the preconcentrators are set forth below. In the first fabrication process, the preconcentrators may be fabricated using a glass micromachining process as seen in FIGS. 4A-4H. Referring to FIGS. 4A and 4B, this fabrication process may use two glass substrates (Substrate 1 and 2) that may be micromachined separately and then bonded together. Substrate 1 may be etched to create the sorbent chamber and fluidic channels as seen in FIG. 4C. Substrate 2 may be metallized to create thin film metal heaters and temperature sensors as seen in FIG. 4D. In FIG. 4E, both substrates may be etched through in the designated cut-out areas to create supporting bridges. The etching process may be wet etching, sandblasting, or plasma etch. Next, the two substrates may be bonded together to form the preconcentrator structure as seen in FIG. 4G. Finally, sorbent particles may be packed into the sorbent chamber from the sorbent loading port with a gentle vacuum in FIG. 4H. The process constraints limit the wall thicknesses to a minimum of 50 µm for the top and bottom walls and 200 µm for sidewalls.

Figure 5A:
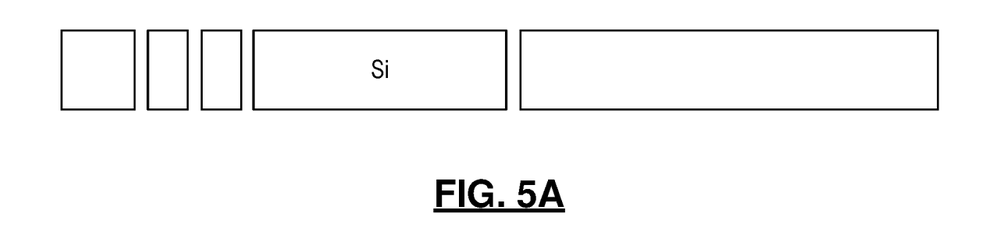
FIG. 5A-5G are diagrams illustrating a silicon micromachining process for ultra-low power preconcentrator.
Figure 5B:
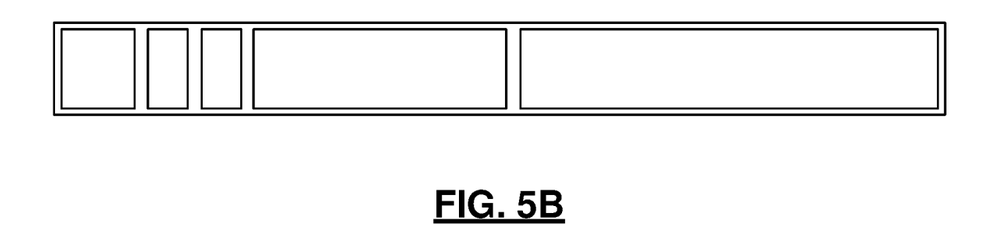
Figure 5C:
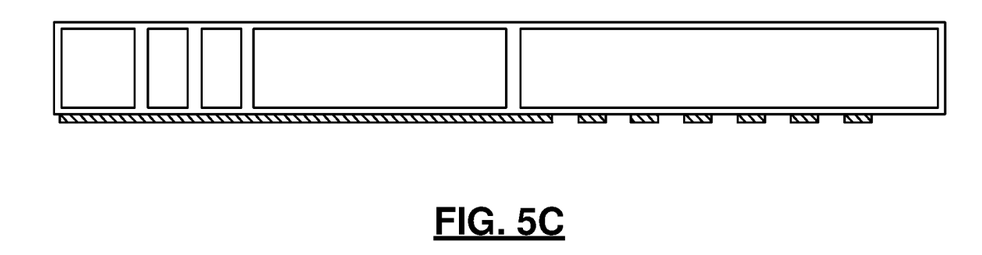
Figure 5D:
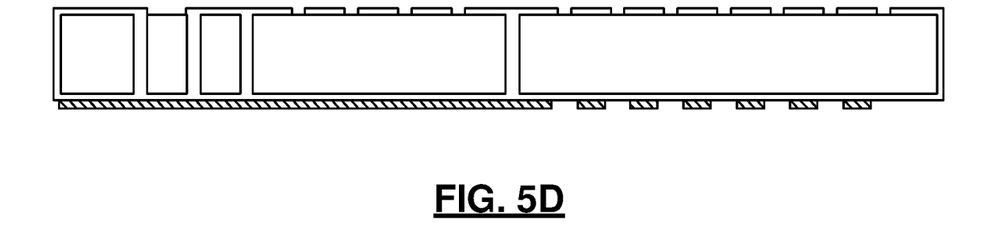
Figure 5E:
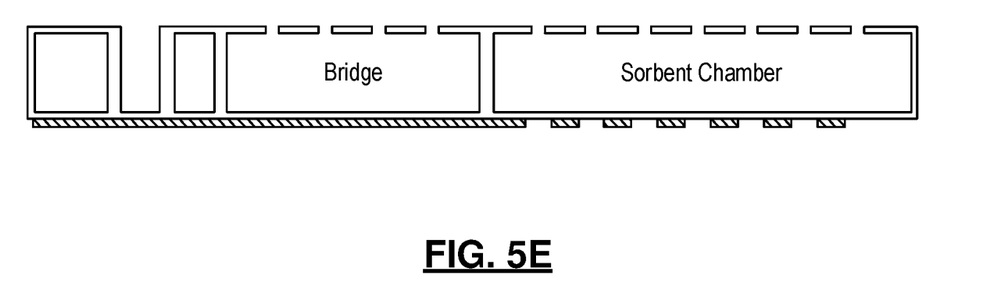
Figure 5F:
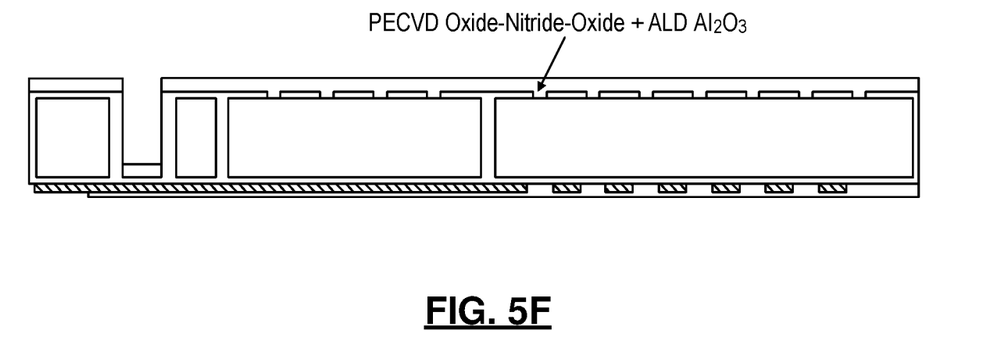
Figure 5G:
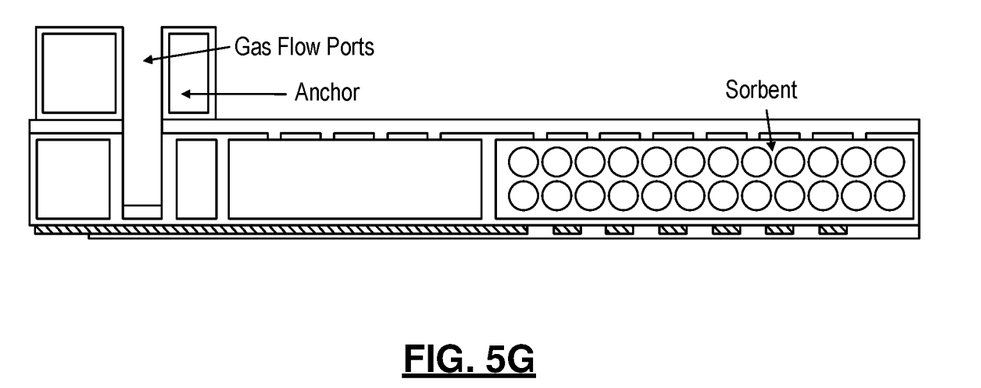

In the second fabrication process, the preconcentrators may be fabricated using a silicon micromachining process as seen in FIGS. 5A-5G. The main Si substrate may be first etched through to create narrow trenches using deep reactive ion etching (DRIE) (FIG. 5A). Next, a stress-relieved stack of oxide-nitride-oxide may be deposited to fill the narrow trenches, which may form the sidewalls of the preconcentrator (FIG. 5B). Following planarization and deposition of another oxide-nitride-oxide layer, a thin metal layer may be deposited and patterned to form heaters and temperature sensors (FIG. 5C). The dielectric stack on the top side of the substrate may be patterned to create openings (FIG. 5D) for a subsequent Si etch, which may be performed by using $XeF_2$ dry gas to form the sorbent chamber and its supporting bridge (FIG. 5E). The openings will be sealed by plasma enhanced chemical vapor deposition (PECVD) of a thick oxide-nitride-oxide layer and atomic layer deposition (ALD) of a thin $Al_2O_3$ layer (FIG. 5F). The overall wall thickness provided by this approach can be as low as 10 µm; this may greatly reduce thermal mass while providing sufficient mechanical robustness. Finally, in an optional step, another Si substrate with DRIE gas flow ports may will be bonded to the main substrate (FIG. 5G) to form the cantilever suspension. The sorbent particles will be packed into the sorbent chamber from the sorbent loading port with a gentle vacuum. These two technique are merely exemplary and other fabrication techniques also fall within the broader aspects of this disclosure.

One benefit of using short separation columns is that the pressure drop at the required flow rate can be easily provided by a low-compression-ratio micropump using air as the carrier gas, eliminating the use of high-compression-ratio gas pumps or pressurized carrier gas bottles. The flow resistance (i.e., ratio of pressure drop to flow rate) of a separation column can be calculated using the Hagen-Poiseuille equation:

$$\frac{\Delta P_{column}}{Q_{column}} = \frac{128 \eta_{air} L_{column}}{\pi d_{column}^4} \quad (1)$$

where $\Delta P_{column}$ and $Q_{column}$ are the pressure drop and flow rate of the column, respectively; $L_{column}$ and $d_{column}$ are the length and hydraulic diameter of the column, respectively; and $\eta_{air}$ is the dynamic viscosity of air. For a column of 1-m length and 250-µm hydraulic diameter, the flow resistance is 3.4 kPa/sccm.

The flow resistance of a preconcentrator packed with a bed of sorbent particles can be estimated using the Ergun equation:

$$\frac{\Delta P_{precon}}{Q_{precon}} \approx \frac{150 \eta_{air} \cdot L_{bed}}{d_{particle}^2 \cdot (W_{bed} \cdot H_{bed})} \frac{(1-\varepsilon)^2}{\varepsilon^3} \quad (2)$$

where $\Delta P_{precon}$ and $Q_{precon}$ are the pressure drop and flow rate of the preconcentrator, respectively; $L_{bed}$, $W_{bed}$, and $H_{bed}$ are the length, width, and height of the sorbent bed, respectively; $d_{particle}$ is the sorbent particle diameter; $\varepsilon$ is the void fraction of the bed. For a preconcentrator with $L_{bed}$=5 mm, $W_{bed}$=1 mm, $H_{bed}$=0.5 mm (therefore a 2.5 mm³ chamber for containing 1 mg of sorbent), $d_{particle}$=180 µm (US mesh 80), and $\varepsilon$=0.4, its flow resistance is 0.086 kPa/sccm.

In the example embodiment, the FCD will have a flow resistance of 0.26 kPa/sccm. The fluidic connections may be provided by a compact arrangement of microfabricated channels, also presenting negligible flow resistance. Therefore, the flow resistance during vapor collection will be kPa/sccm, which will require the micropump to provide a collection flow rate of 1 sccm at a pressure head of 1.5 kPa. The average flow resistance during separation will be ≈5.5 kPa/sccm, which will require the micropump to provide a pressure head of 3.3 kPa at a collection flow rate of 0.6 sccm.

The vapor collection will be performed by using the micropump to draw the ambient vapor sample through a series of preconcentrators. In the example architecture (FIG. 1), four preconcentrators connected along collection flow path are Preconcentrator4 packed with 1 mg of glass beads, Preconcentrator3 packed with 1 mg of Carbopack C, Preconcentrator2 packed with 1 mg of Carbopack B, and Preconcentrator1 packed with 1 mg of Carbosieve SIII (Table 1). In normal operation, a 20 mL volume of the ambient sample will be collected, using 1-sccm flow for 20 minutes. This volume can be reduced if overloading is detected, as described in the following sub-sections. With these parameters, Preconcentrator4 will target vapors with volatilities higher than n-alkane $C_{12}$, including heavy species like pentabromoethane (420 amu); Preconcentrator3 will target vapors with volatilities in the range of n-alkane $C_9$-$C_{12}$, Preconcentrator2 will target vapors with volatilities in the range of n-alkane $C_5$-$C_9$; Preconcentrator1 will target vapors with volatilities in the range of n-alkane $C_2$-$C_5$, including light species like ethane (30 amu).

Because of the distinction in the adsorption capabilities (i.e., surface area) of the sorbents selected for each cell and the series arrangement along the gas flow path, typically each vapor species will be predominantly trapped by only one preconcentrator. Specifically, this vapor species will achieve breakthrough in the upstream preconcentrators that are packed with weaker sorbents, but will be trapped by the targeted preconcentrator, hence it will not enter the downstream preconcentrators with stronger sorbents. For example, when collecting vapor at 20° C., hexane is not adsorbed by glass beads at all, and has a breakthrough volume of 1.3 mL/mg (collection volume per sorbent mass) in Carbopack C and 80 mL/mg. Therefore, with a 20 mL collection volume, hexane will easily pass through Preconcentrator4 and Preconcentrator3, get trapped by Preconcentrator2, and will not enter Preconcentrator1. During this process, 94% of the ambient hexane will be trapped by Preconcentrator2, and will be properly separated in Cell2. The remaining 6% of hexane in Preconcentrator2 will be injected into the columns in Cell3 and will elute as an almost unretained peak that does not interfere with the separation of other vapor species in Cell3. Some vapor species may be trapped by two preconcentrators in comparable amounts (e.g., pentane will be trapped by both Preconcentrator2 and Preconcentrator1); these species will be separated in both cells. Because the eluents in all the cells eventually flow into a common vapor identification device, dividing the same species between two cells will not cause any sample loss.

The parameters of the separation columns in the example architecture are summarized in Table 1. All columns will be 1 m long and 250 μm in hydraulic diameter, except for Column2p and Column3p, which will be only 0.1 m long and used for preliminary separation based on polarity. In Cell4, Column4 will be coated with 0.01 μm-thick DB-5 ms stationary phase, which is commonly used for separating semivolatiles. Column4 will separate vapors with volatilities in the range of n-alkane $C_{12}$-$C_{15}$ (i.e., Kovats retention index range of 1200-1500), including certain heavy species up to 420 amu (pentabromoethane). In Cell3, the separation column will target vapors with volatilities in the range of n-alkane $C_9$-$C_{12}$ (i.e., Kovats retention index range of 900-1200). The Column3p will be coated with a 0.2 μm-thick Carbowax 20M polar stationary phase that preliminarily will coarsely separate the target mixture into a non-polar group and a polar group. The non-polar group will be separated by Column3a coated with a 0.2 μm-thick OV-1 non-polar stationary phase, whereas the polar group will be separated by Column3b coated with a 0.2 μm-thick OV-215 polar stationary phase. In Cell2, the separation column will target vapors with volatilities in the range of n-alkane $C_5$-$C_9$ (i.e., Kovats retention index range of 500-900). The Column2p will be coated with a 2 μm-thick Carbowax 20M polar stationary phase that preliminarily will separate the target mixture into a non-polar group and a polar group. The non-polar group will be separated by Column2a coated with a 2 μm-thick OV-1 non-polar stationary phase, whereas the polar group will be separated by Column2b coated with a 2 μm-thick OV-215 polar stationary phase. In Cell1, Column1 will be coated with a 2 μm-thick porous alumina stationary phase for separating highly volatile species in the range of n-alkane $C_2$-$C_5$ (i.e., Kovats retention index range of 200-500), including light species down to 30 amu (ethane). The stationary phases used in all the columns will be coated using the static coating method and subsequently cross-linked; this is a standard procedure that provides good coating uniformity and thermal stability.

During the analysis phase, the separation columns contained in each cell will be employed in a sequential order that is linked to other elements in the cell. In particular, the desorption of the preconcentrator and the switching of the FCD in each cell will determine when the separation is initiated in the cell. Each column will use a flow rate of 0.6 sccm, and hence will require a flow velocity (u) of 0.2 m/s. The hold-up time (i.e., elution time of the carrier gas, $t_0$) of each 1 m-long column will be 4.6 s. The separation efficiency, represented by the height equivalent to a theoretical plate (H), can be calculated by Rate Theory:

$$H = \frac{2D_m}{u} + \frac{1+6k+11k^2}{96(1+k)^2}\frac{d_{column}^2}{D_m}u + \frac{2}{3}\frac{k}{(1+k)^2}\frac{h_s^2}{D_s}u \qquad (7)$$

where k is the retention factor, $D_m$ and $D_s$ are the diffusion coefficients in the carrier gas and the stationary phase, respectively, and $h_s$ is the stationary phase thickness. Using as an example the retention of benzene in Column2a: benzene has a partition coefficient ($K_D$) of 296 between OV-1 and air, whereas Column2a has a $d_{column}$ of 250 μm, an $h_s$ of 2 μm, and a phase ratio (β) of 31.3; hence benzene has a retention factor of 9.5 (k=$K_D$/β). $D_m$=0.1 cm$^2$/s; $D_s$=5×10$^{-6}$ cm$^2$/s. Therefore, the value of H is 0.033 cm, and the number of plates (N) for the 1 m-long columns is 3070 (N=$L_{column}$/H).

The retention time ($t_R$) of a vapor species can be calculated by:

$$t_R = (1+k)t_0 \qquad (8)$$

As Column2a targets vapors with volatilities in the range of n-alkane $C_5$-$C_9$, the vapors in Column2a have a k range of 2.6-125.0 and hence a $t_R$ range of 0.3-9.7 minutes. Similar calculations can be performed for the other separation columns to obtain that the retention times. These calculations reveal that Column4 requires 16 minutes, Column3a and Column3b each will require 17 minutes, and Column2a, Column2b, and Column1 each require 10 minutes. Therefore, the total time required will be 80 minutes. This time will be achieved with a carrier gas flow rate of 0.6 sccm at room temperature.

The peak capacity (i.e., the maximum number of peaks that can be separated within a specified retention time range) can be calculated by:

$$\text{Peak capacity} = \frac{\sqrt{N}}{4} \ln \frac{t_{R,max}}{t_{R,min}} \qquad (9)$$

As Column2a has a $t_R$ range of 0.3-9.7 min and an N value of 3070, the resulting peak capacity will be 49. With all the 6 columns used in the 4 cells, the maximum total peak capacity can reach nearly 300. Considering the extra-column volumes in the system (contributed by preconcentrators, detectors, FCDs, and fluidic connections), as well as the species that are collected and separated in two adjacent cells, a peak capacity of 150-300 is estimated for a 4-cell progressive cellular architecture. While an exemplary embodiment of a gas chromagraph 10 has been described above with specific components having specific values and arranged in a specific configuration, it will be appreciated that these systems may be constructed with many different configurations, components, and/or values as necessary or desired for a particular application. The above configurations, components and values are presented only to describe one particular embodiment that has proven effective and should be viewed as illustrating, rather than limiting, the present invention.

Studies have shown that the breakthrough volume of a vapor species in a sorbent bed is affected by the vapor concentration. This effect can be modeled by a Langmuir adsorption isotherm, which has been widely used to provide first-order quantitative estimation. In the Langmuir model, the breakthrough volume ($V_b$) can be express as follows:

$$V_b = 1 \Big/ \left( \frac{1}{b \cdot m_{max}} + \frac{c}{m_{max}} \right) \qquad (10)$$

where b is the distribution coefficient, which is defined as the ratio of the adsorption rate constant to the desorption rate constant; c is the vapor concentration; and $m_{max}$ is the maximum adsorption capacity. It can be seen that at a low vapor concentration (c<<1/b), $V_b$ is approximately equal to $b \cdot m_{max}$ and independent of the concentration. As the concentration increases, the vapor molecules start to exhibit competition for the adsorption sites, causing a decrease in $V_b$.

Figure 6:
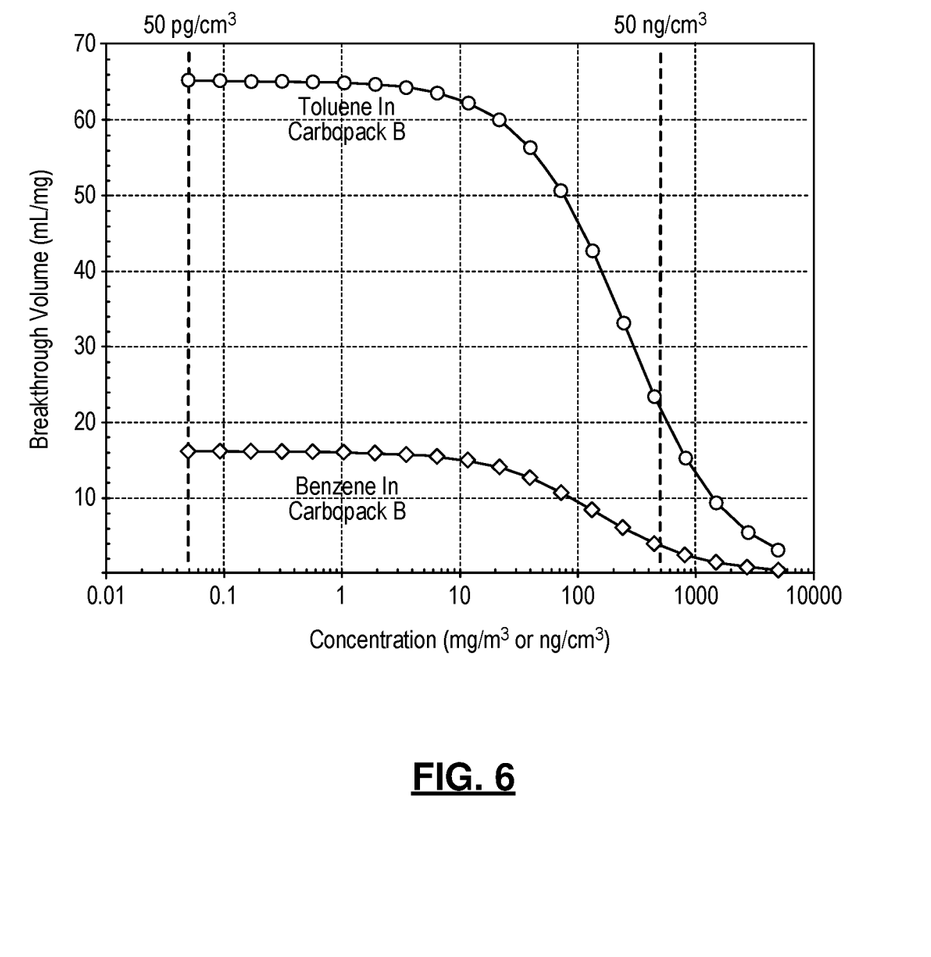
FIG. 6 is a graph showing the calculated breakthrough volume of benzene and toluene in Carbopack B assuming a Langmuir isotherm.

Rather than avoiding breakthrough as in the conventional vapor collection approaches, the system exploits the breakthrough properties of appropriately selected and sequentially arranged sorbents to achieve a de facto preliminary separation during vapor collection. Therefore, the breakthrough process must be well controlled to accommodate a wide range of vapor concentrations. To show the effect of vapor concentration, the breakthrough of benzene and toluene in the preconcentrators are used as examples. In the 4-cell system (Table 1), both benzene and toluene are intended to be trapped by Preconcentrator2 (which is packed with 1 mg of Carbopack B). According to the Langmuir model (Equation 10), toluene has a breakthrough volume of 65 mL/mg of Carbopack B at a concentration of <10 ng/cm³ (FIG. 6). With 1 mg of Carbopack B and a collection volume of 20 mL, toluene is predominantly trapped by Preconcentrator2 without breakthrough. When the toluene concentration increases to 500 ng/cm³, the breakthrough volume decreases from 65 mL/mg to mL/mg, indicating that toluene is still predominantly trapped by Preconcentrator2 without breakthrough. In contrast, for benzene, the breakthrough volume decreases from 16 mL/mg to 4 mL/mg as the concentration increases from <10 ng/cm³ of 500 ng/cm³. Therefore, as the benzene concentration increases, an increasing fraction of benzene is trapped by Preconcentrator1 whereas a lower fraction is trapped by Preconcentrator2. Nevertheless, benzene is separated in both Cell2 and Cell1 regardless of the concentration, hence the system operation is unaffected.

Excess increase in the concentration (>500 ng/cm³) can cause a significant breakthrough that can lead to an excessive amount of vapor being trapped by the wrong preconcentrator; this effect can be mitigated by reducing the vapor collection volume. Excessive vapor concentration can be detected by a series of capacitive detectors located along the vapor collection path (FIG. 2A). These detectors can inform the control software to reduce the vapor collection volume, by either reducing the collection flow rate or reducing the collection period. For example, when collecting a sample with saturated benzene vapor (500 μg/cm³), the collection volume can be reduced from the default 20 mL to 20 μL, by using a flow rate of 0.02 sccm and a collection duration of one minute. Using this method, concentrations ranging from 50 pg/cm³ up to 500 μg/cm³, or the saturation concentration for a single compound, can be effectively collected.

Using the method described above, the mass range of a single species that can be effectively collected by the progressive cellular architecture is 1 ng-10 μg. The estimated sample capacity of the separation columns specified in Table 1 can reach 600 ng per species. For the collected mass range of 1-600 ng of a single species, separation can be performed without overloading the columns. If the collected mass is in the range of 600 ng-10 μg, the detector and FCD located halfway along each 1 m-long column (e.g., the Detector2b and FCD2b in FIG. 2A) can be used to detect overloading and divest a portion of the excess mass into the ambient. As a result, the proposed separation approach can accommodate a single-compound concentration range of 10,000×. In contrast to the conventional split injection technique where the entire mixture is divested away from the column, the approach described herein (FIG. 2A) only divests the overloading species while preserving the other low-concentration species for the downstream detection and identification.

In practice, during vapor collection, the detectors located along the collection path (e.g., the Detector2a in FIG. 2A) will detect the overall vapor concentration rather than the concentration of a single compound. The breakthrough volumes of the preconcentrators will also be affected by the overall vapor concentration. Therefore, by rough estimate, the mass range of the total vapor mixture that can be effectively collected will be similar to that for a single species, which is 1 ng-10 μg. With a preconcentrator desorption volume of 4 μL, the maximum total vapor concentration that can practically be injected into each separation column is 2.5 mg/cm³. Nevertheless, even for total injected vapor concentration up to 10 mg/cm³, the split flow capability of the separation columns should provide sufficient reduction of the concentration and hence acceptable separation resolution. The low end of the total vapor concentration (10 ng/cm³) is easily separable by the separation columns.

Temperature overshoot during preconcentrator desorption can be minimized by appropriate choices of materials utilized and proper thermal management. In practice, during preconcentrator desorption, the input power varies within the applied thermal pulse. As the temperature is elevated, the thin-film metal (Pt) heater undergoes an increase in resistance. Therefore, with a constant voltage supply, the input power reduces over the duration of the pulse, inherently reducing temperature overshoot.

Concerns about the repeated use of the gas chromatography components include the impact of exposure to undesired chemicals or degradation of coating materials or pump parameters over time. These problems are addressed by the progressive cellular architecture. With multiple preconcentrators connected in series and arranged in the order from weak adsorption to strong adsorption along the collection flow, each preconcentrator is designed to be exposed only to a targeted range of vapor species that can be properly desorbed. That is, a preconcentrator with strong sorbent is not exposed to low-volatility species. Similarly, in the progressive cellular architecture, each separation column is only exposed to a targeted range of vapor species that can properly elute in the column. Additionally, each preconcentrator uses a desorption flow direction that is opposite to the collection flow direction, which ensures full desorption for separation and absence of residue remaining in the preconcentrator.

This disclosure pertains to an architecture of microfabricated components for vapor collection and chromatographic separation comprised of a series of heterogeneous cells. Each individual cell targets vapor species within a specific volatility range by using a unique combination of preconcentrators and separation columns. All the cells are connected in a progressive manner to cover a broad range of vapors. The architecture is amenable to the incorporation of additional cells, which can increase to extraordinary levels the volatility range that can be analyzed.

Various advantages are derived from this architecture. With all the cells connected in a serial and progressive manner, partial vapor separation is achieved de facto during vapor collection. Each cell is unexposed or minimally exposed to the vapor species outside its targeted volatility range. Compared to conventional gas chromatography architectures, where all the collected vapor species are injected into a single separation column, which is then heated for chromatographic separation, the progressive cellular architecture requires minimal or no column heating, providing massive power savings in total energy consumed per measurement cycle.

Detectors and FCDs positioned along the separation columns detect and split off the overloading species, while retaining low-concentration species for quantitative analysis.

With this approach, the time and energy consumption of the sorption and separation components can be substantially reduced by reducing their thermal mass. This is achieved by using thin-film structures fabricated using advanced micromachining techniques.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A gas chromatography architecture, comprising:
   two or more preconcentrators coupled together in series, the two or more preconcentrators having an input configured to receive an analyte and an output, each preconcentrator comprising a chamber through which the analyte passes and sorbent material within the chamber, wherein surface area of sorbent material residing in a given preconcentrator increases from the input to the output across the two or more preconcentrators;

a separation column associated with each preconcentrator of the two or more preconcentrators, each separation column having a channel through which the analyte passes; and a three-port fluidic coupling device disposed at an inlet of each preconcentrator in the two or more preconcentrators, the first port of the fluidic coupling device configured to receive an incoming analyte, the second port of the fluidic coupling device fluidly coupled to an inlet of an associated preconcentrator and a third port of the fluidic coupling device fluidly coupled to an associated separation column.

2. The gas chromatography architecture of claim 1 further comprises a pump fluidly coupled to the output of the two or more preconcentrators.

3. The gas chromatography architecture of claim 2 wherein the pump operates to draw the analyte in a first direction during the collection phase and operates to drive a carrier gas in a second direction opposite the first direction during a separation phase.

4. The gas chromatography architecture of claim 1 further comprises a detector selectively coupled to each of the separation columns, each separation column having an outlet fluidly coupled along a separation path to the detector.

5. The gas chromatography architecture of claim 4 further comprising a secondary detector disposed upstream from one of the two or more preconcentrators, wherein the controller is in data communication with the secondary detector and, in response to detecting a vapor concentration above a threshold, operates to reduce flow rate of the pump or reduce the collection period during the collection phase.

6. The gas chromatography architecture of claim 4 further comprising
a secondary detector disposed along a given separation path downstream from a given separation column;
a secondary separation column disposed downstream along the given separation path from the secondary detector; and
a secondary three-port fluidic coupling device fluidly coupled between the secondary detector and the secondary separation column.

7. The gas chromatography architecture of claim 1 wherein the analyte traverses the two or more preconcentrators in a first direction during a collection phase and a carrier gas that traverses the preconcentrators in a second direction during a separation phase.

8. The gas chromatography architecture of claim 1 wherein each separation column includes a stationary phase and the stationary phases vary amongst the separation columns.

9. The gas chromatography architecture of claim 1 wherein each of the three-port fluidic coupling device is configured in a normally open position whereby the first port is fluidly coupled to the second port while gas flow through the third port is blocked.

10. The gas chromatography architecture of claim 9 further comprises a controller operably coupled to each of the fluidic coupling devices, wherein the controller maintains each of the fluidic coupling devices in the normally open position during a collection phase.

11. The gas chromatography architecture of claim 10 wherein the controller actuates each of the fluidic coupling devices in succession from a normally open position to a closed position during a separation phase, whereby the second port is fluidly coupled to the third port while the first port is blocked in the closed position.

12. The gas chromatography architecture of claim 1 further comprises:
a polar separation column disposed downstream along a given separation path from a given three-port fluidic coupling device; and
a non-polar separation column disposed downstream in the given separation path from the given three-port fluidic coupling device and arranged in parallel with the polar separation column.

13. A method for gas chromatography, comprising:
providing two or more preconcentrators coupled together in series, each preconcentrator comprising a chamber through which the analyte passes and having sorbent material within the chamber,
drawing a carrier gas with an analyte in a first direction through an inlet and into the two or more preconcentrators during a collection phase, where surface area of sorbent material in a given preconcentrator increases across the two or more preconcentrators in the first direction;
associating a separation column with each preconcentrator in the two or more preconcentrators, each separation column having a channel through which the analyte passes;
driving the carrier gas in a second direction through the two or more preconcentrators during a separation phase, where the second direction is opposite the first direction; and
directing the carrier gas through the separation columns successively, such that the carrier gas passes through a given separation column while blocking the carrier gas from entering preconcentrators located downstream of the given separation column.

14. The method of claim 13 further comprises detecting vapor concentration at output of the separation columns.

15. The method of claim 13 further comprises disposing a three-port fluidic coupling device at an inlet of each preconcentrator in the two or more preconcentrators, the first port of the fluidic coupling device configured to receive an incoming carrier gas, the second port of the fluidic coupling device fluidly coupled to an inlet of an associated preconcentrator and the third port of the fluidic coupling device fluidly coupled to an associated separation column.

16. The method of claim 15 further comprises controlling each of the fluidic coupling devices using a controller, wherein each of the three-port fluidic coupling device is configured in a normally open position whereby the first port is fluidly coupled to the second port while gas flow through the third port is blocked, and the controller maintains each of the fluidic coupling devices in the normally open position during the collection phase.

17. The method of claim 16 further comprises actuating each of the fluidic coupling devices in succession from a normally open position to a closed position during the separation phase, whereby the second port is fluidly coupled to the third port while the first port is blocked in the closed position.

* * * * *